United States Patent [19]

Kennington et al.

[11] 4,194,415
[45] Mar. 25, 1980

[54] QUADRANT DRIVE

[76] Inventors: Frank W. Kennington, Les Ruisseaux House, St. Brelade, Jersey, Channel Islands; Panayotis C. Dimitracopoulos, P.O. Box N. 7776, Nassau, The Bahamas

[21] Appl. No.: 904,024

[22] Filed: May 8, 1978

[51] Int. Cl.² .................................................. F16H 1/28
[52] U.S. Cl. ...................................................... 74/805
[58] Field of Search .................................. 74/804, 805

[56] References Cited

U.S. PATENT DOCUMENTS

| | | | |
|---|---|---|---|
| 3,383,931 | 5/1968 | Patterson, Jr. | 74/804 X |
| 3,472,097 | 10/1969 | Huska | 74/804 |
| 3,783,712 | 1/1974 | Colinet | 74/805 |
| 3,985,047 | 10/1976 | Therkelsen | 74/805 |
| 3,998,112 | 12/1976 | Pierrat | 74/805 |
| 4,023,440 | 5/1977 | Kennington et al. | 74/805 X |

Primary Examiner—Lance Chandler

[57] ABSTRACT

A motion transmitting device including four basic elements, namely, eccentric means, meshing means formed from a number of meshing elements which are linked but movable independently with respect to each other, wheel means formed with portions adapted to engage said meshing elements, and movement limiting means, including a datum member, wherein said eccentric means is disposed to cause each of said meshing elements to become engaged with, and subsequently to become dissociated from, said portions, while said meshing elements are individually guided by said movement-limiting means within specific limits of movement relative to said datum member, such that always a plurality of adjacent ones of said meshing elements are simultaneously in driving engagement with, and stationary relative to, a corresponding number of said portions, and that the total movement relative to said datum member of each of said meshing elements, while it is drivingly engaged with one of said portions, follows a substantially ovoidal path.

Any two of the four basic elements can provide the input and the output of the device, and any desired ratio between input and output rotation speeds, in single or multiple-stage arrangements, can be obtained, by suitably choosing the numbers of meshing elements and complementary portions on the wheel means.

23 Claims, 30 Drawing Figures

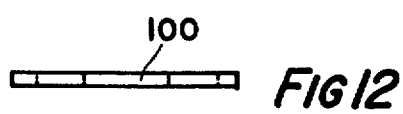
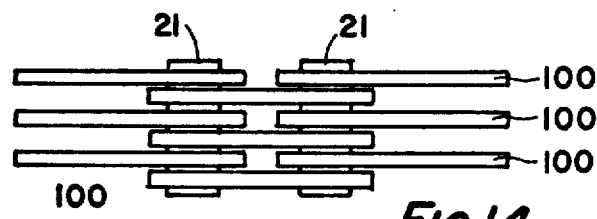
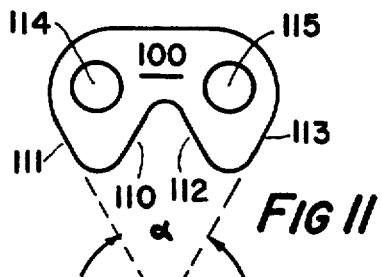
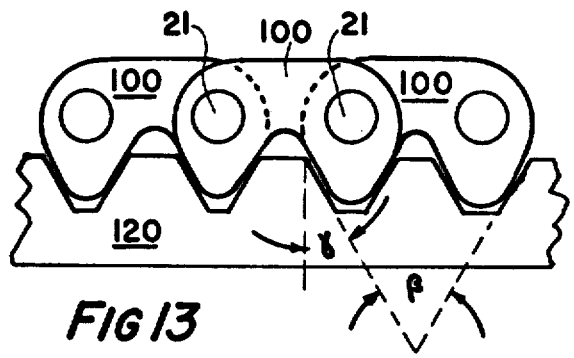
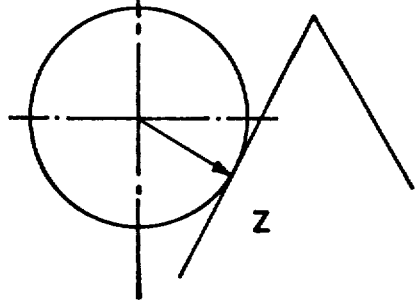
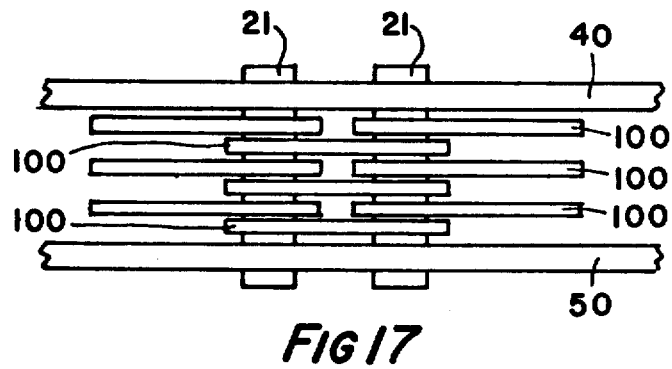
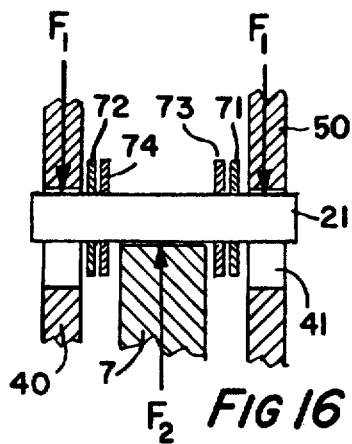
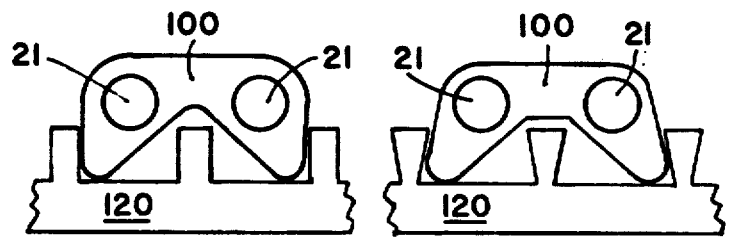
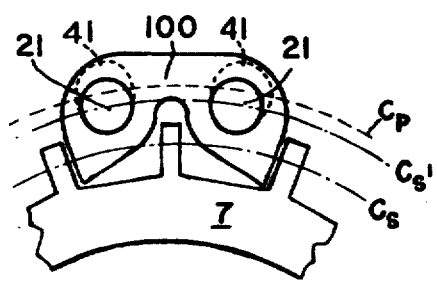

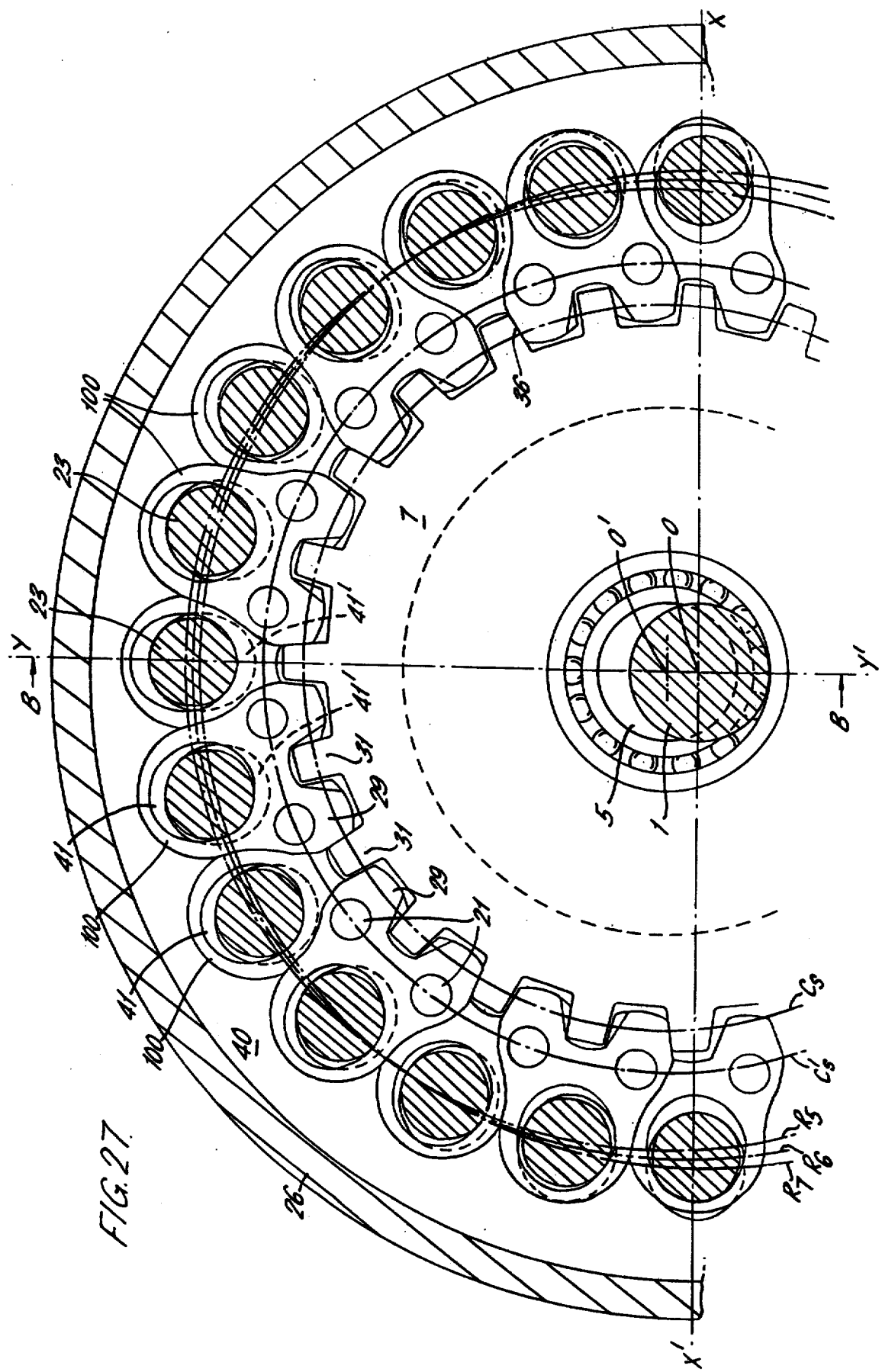

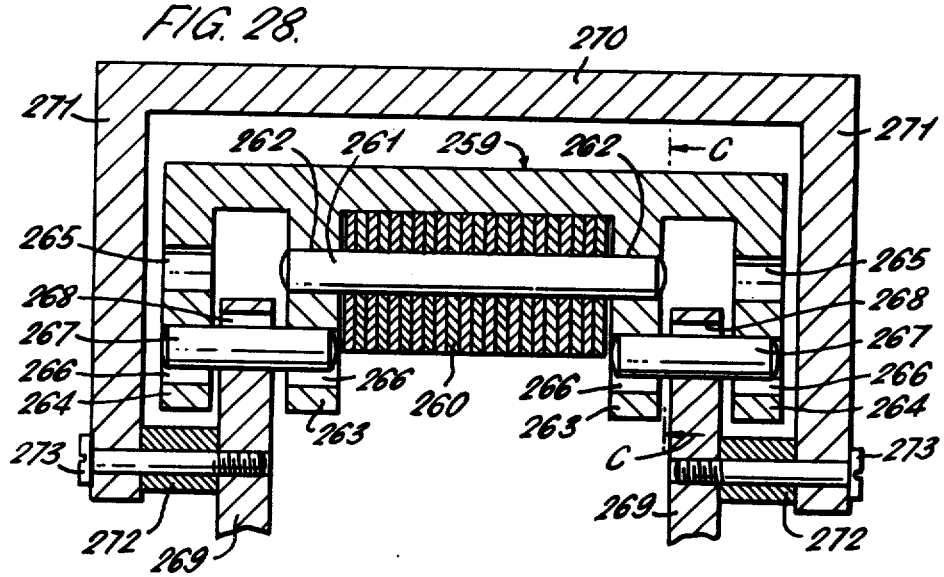
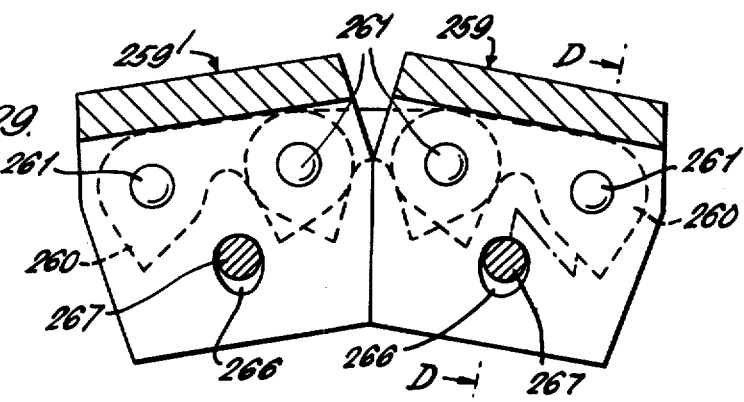
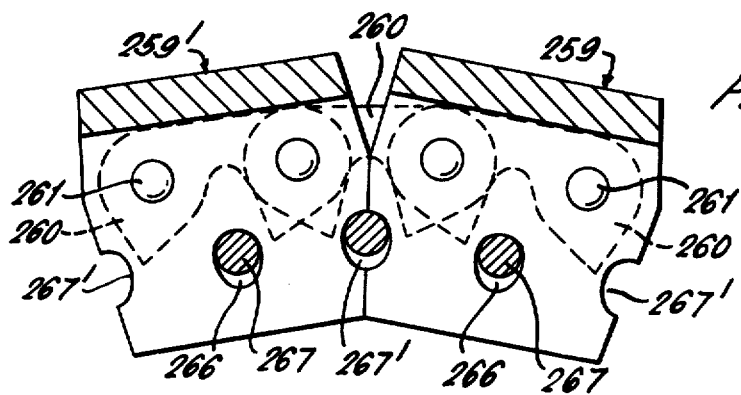

QUADRANT DRIVE

The invention described herein was disclosed in the U.S. Patent Office Disclosure Document No. 048,962 filed on Apr. 29, 1976 for "Improvements in Motion-Transmitting Devices".

FIELD OF INVENTION

This invention relates to Gearing Devices, Speed-changing devices, Motion-Transmitting Devices, Torque Converters and the like. It relates more particularly to improvements to the inventions and novel engineering principle pertaining to such devices, disclosed in U.S. Pat. No. 4,023,440 dated May 17, 1977 by the same inventors.

DESCRIPTION OF THE PRIOR ART

Almost all prime movers (motors and the like) provide rotational output speeds which are higher, or much higher, than the required input speeds of the mechanisms they power.

Therefore, speed changers, that is gearing arrangements, are almost universally employed in each and every machine and mechanical device. However, in conventional gearing engagement is provided between a group only of adjoining teeth, usually only one tooth. This enormous waste is taken for granted but it must be remembered that each and every gear-tooth, idly and wastefully rotates most of the time, until its turn arrives to momentarily carry the entire load. Evidently, the larger the speed ratio, the larger the number of idly turning teeth and the larger the waste.

The staggering significance of the aboveidentified U.S. Pat. No. 4,023,440 by means the same inventors can be easily understood, when it is stated that according to its teachings:

"Approximately one half of the teeth of a gear wheel mesh at any given time, and approximately one quarter carry and share the load."

The present invention is concerned with improvements to the device disclosed in the above-referred U.S. Patent by the same inventors.

BRIEF DESCRIPTION OF THE FIGURES

The invention may be reduced to practice in many ways and preferred embodiments thereof will now be described, by way of example, reference being made to the accompanying drawings in which FIGS. 1 to 10 refer to the underlying principles of the invention disclosed in U.S. Pat. No. 4,023,440 and the remaining Figures specifically refer to the improvements taught by the present invention.

FIG. 11 is a front elevation of a known form of a single link of a "silient chain";

FIG. 12 is a top view of the chain of FIG. 11;

FIG. 13 illustrates the chain of FIGS. 11 and 12 engaging a rack;

FIG. 14 is a plan view of a chain formed of a plurality of link elements of the type shown in FIGS. 11 to 13;

FIG. 15 is a diagram illustrating how each link of the conventional roller chain can only have line contact with a meshing tooth;

FIG. 16 is a diagrammatic cross-section through part of a chain sprocket and datum plates for explanatory purposes;

FIG. 17 is a plan view of part of the chain according to the invention contained between datum plates;

FIGS. 18 and 19 are explanatory diagrams illustrating the obtaining of area contact between the chain links and teeth on a rack;

FIG. 20 is a diagram illustrating the obtaining of area contact between teeth on a chain and teeth on a wheel;

FIG. 21 is a diagram illustrating a simple form of recess cutter for producing a wheel of the kind shown in FIG. 20;

FIG. 27 is a cross-sectional view along line A—A of FIG. 26.

FIG. 28 is a cross-section through a chain and part of a datum plate assembly for use in a transmission device of the kind described, the section being along lines D—D of FIG. 29.

FIG. 29 is a sectional side elevation of a bridging member of the chain of FIG. 28, the section being along the line C—C of FIG. 4;

FIG. 30 is a cross-sectional side elevation illustrating a further construction, showing two adjacent bridging members.

INTRODUCTION

The present invention is concerned with improvements to the devices disclosed in U.S. Pat. No.

4,023,440 by the same inventors and it is therefore useful to firstly review its basic teachings. In so doing, reference will be made to FIGS. 1 to 10.

Figure 1:
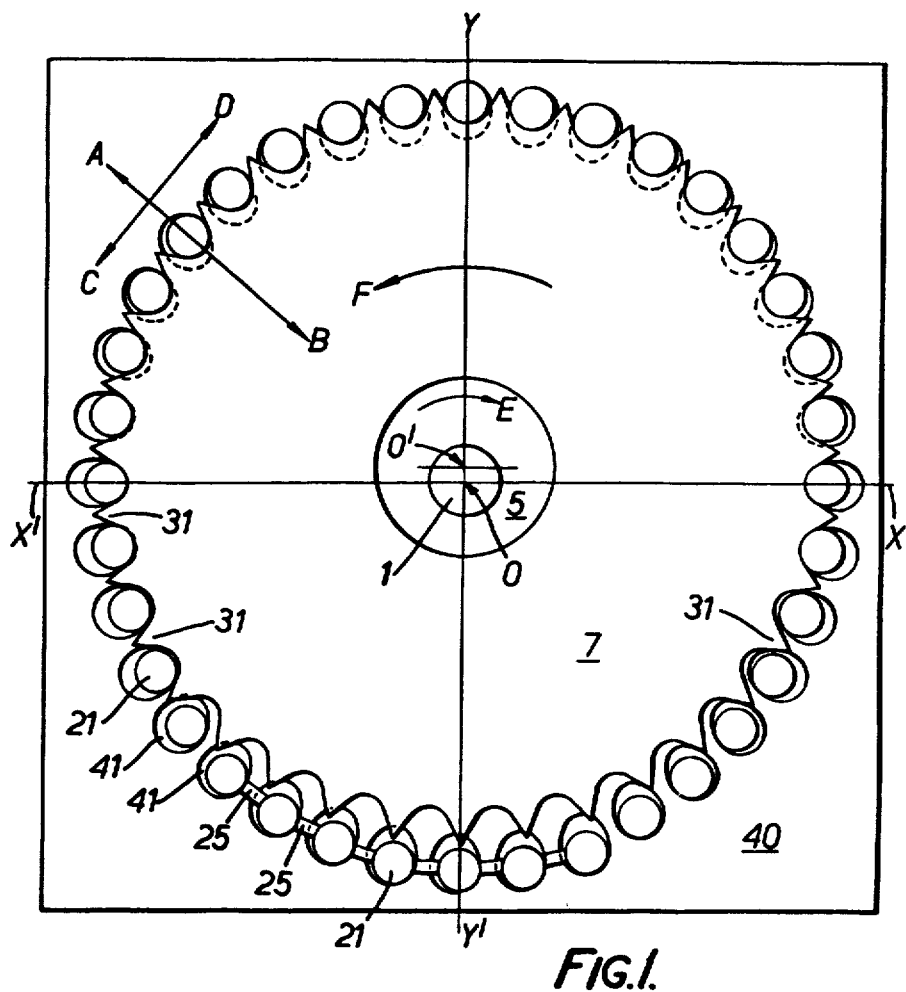
FIG. 1 is a front elevation of a simple embodiment according to the invention, in which only a few interconnecting members 25 are shown, while the others are not shown for clarity.

Referring to FIG. 1, an input shaft 1 is arranged to rotate about its central longitudinal axis O. Fixedly and eccentrically secured on input shaft 1 is an eccentric 5, which is a cylindrical shaft having a central axis O', the eccentrically being the distance O—O'.

A sprocket or gear wheel 7 is journalled for free rotation about the eccentric 5. Therefore, as input shaft 1 rotates about its axis O, the sprocket or gear 7 will either eccentrically rotate (gyrate) or oscillate with respect to this axis O, depending on whether it is free to move round as input shaft 1 rotates or is retrained from moving round.

The gear 7 meshes with a series of "meshing elements", such as pins 21, conveniently interconnected by flexible member 25, thus forming an endless "flexible transmission member" or a "flexible transmission loop".

For clarity only a few pins 21 are shown as being interconnected by member 25, while, in fact, all pins are so interconnected, their axes being held apart at distances substantially equal to the pitch of gear 7. There is at least one more pin 21 than there are gear-teeth 31, so that while pins and teeth mesh above the diametric line X—X', they progressively get out-of-mesh below it.

Figure 4:
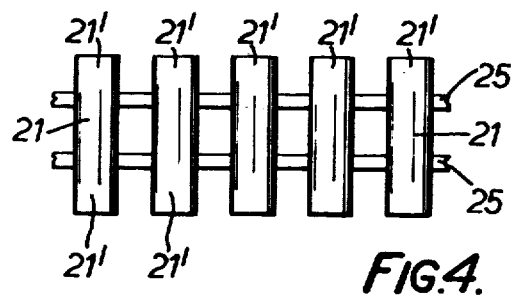
FIG. 4 is a front elevation of a portion of a teeth-meshing endless flexible loop member of the device of FIG. 3.
Figure 5:
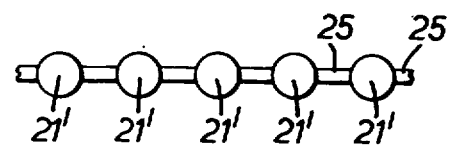
FIG. 5 is a side elevation of the portion of the loop illustrated in FIG. 4.

The arrangement of pins and interconnecting members 25 is better shown in FIGS. 4 and 5. In these figures, the interconnecting members 25 are endless belts. Thus, pins 21 may be held apart by any convenient means, for example by one but preferably two endless flexible belts 25. The distance between these two belts 25 is such that the gear teeth of gear 7 may engage and mesh with the pins 21 but, in addition, it will be noted that the pins 21 extend or protrude beyond the belts 25 and such protruding ends 21' are contained (for limited motion) within holes 41 formed in a stationary datum plate 40. As will be explained below, these protruding ends 21' and the holes 41, constitute the "movement-limiting means" of the invention; in general, the movement-limiting means include "engaging means" (such as the protruding ends 21') and "capturing means" (such as the holes 41 on datum plate 40).

The stationary datum plate 40 is adjacent to, and parallel to, the plane of the gear 7 and is formed with a series of holes, such as the above-mentioned holes 41, the number of holes being equal to the number of pin ends 21', all these holes being arranged equidistantly about the axis of rotation of the shaft 1. Each pin 21 is long enough to enter one such hole, the size and geometric configuration of each hole 41 being such as to restrain one protruding end 21' of pin 21 within the required two directional limits. For example, referring to one such hole 41, it allows pin 21 to move in the tangential direction CD as well as in the radial direction BA.

The reason for limiting the motion of individual pins 21, within the limits imposed by holes 41, is the following: as the gear 7 gyrates, portions thereof move further away from the axis of the shaft 1; it is therefore necessary to allow each and every pin 21 a linear motion in the radial sense BA. Accordingly, the holes 41 in the datum plate provide the means for containing and restraining the motion of each and every pin 21 in the radial direction, thus ensuring the meshing of each and every pin with the teeth of gear 7 when required. Furthermore, because there are at least one more pins than teeth on gear 7 and in order to allow the progressive meshing of all pins with all teeth, some wobbling motion of individual pins must also be allowed and, accordingly, each and every pin 21 is also allowed a tangential motion in the direction CD. Thus the pins may be said to "wobble" in and out of engagement with the teeth of a complete cycle. The combination of such radial and tangential motions during an entire cycle, plus the actual diameter of the protruding end 21' of such pin 21, determines the proper size and shape of the capturing holes 41.

Figure 2:
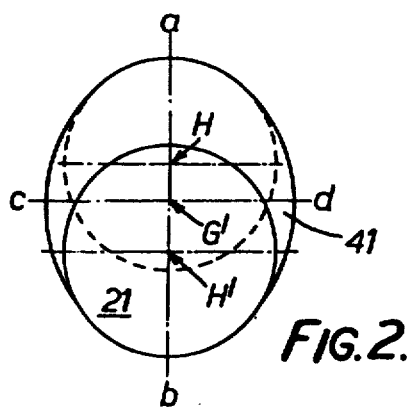
FIG. 2 is also a front elevation of an enlarged view of one "capturing means" 41 and one "engaging means" 21', according to the invention.

Specifically, referring to FIG. 2, the larger dimensions a-b of holes 41 is substantially equal to the diameter of a protruding end 21' of a pin 21, plus the eccentricity O—O', such larger dimension a-b being along the radial sense A-B of FIG. 1.

Although one plate 40 may suffice, two are preferable, with holes engaging the respective two protruding ends 21' of each pin 21. The gear 7 rotates between these two plates 4C.

The operation of the device is as follows:

As shaft 1 rotates, the eccentric 5 will force gear 7 to gyrate in the same direction and to rotate in the opposite direction, the rotation being at a greatly reduced speed. While the gear 7 is thus rotating and gyrating, each pin (on the endless belts 25) will gyrate, its protruding end 21' wobbling within its restraining hole 41 on plate 40. The important feature being that approx. half the pins will mesh at all times.

In the example of FIG. 1, there are 35 gear-teeth and 36 pins and, therefore, for every revolution of input shaft 1, say in the direction of arrow E, the gear 7 will rotate by 1/35 th of a revolution, in the direction of arrow F. Thus, in the above example, the meshing means comprise a series of pins 21, interlinked in a flexible transmission loop (for example, a special form of transmission chain). The movement-limiting means comprise the protruding ends 21' of pins 21, which were captured, for limited wobbling motion, by holes 41 on datum plates 40, such holes 41 being the capturing means.

Figure 6:
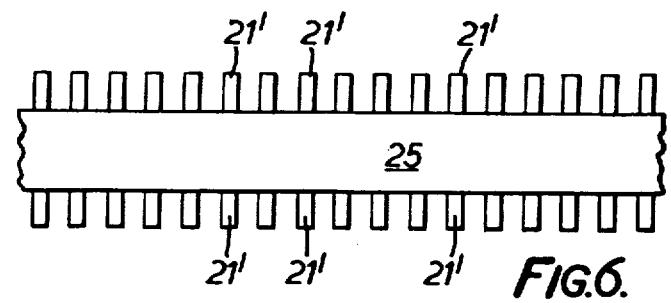
FIG. 6 is a front elevation of a portion of another embodiment of a loop of the invention.
Figure 7:
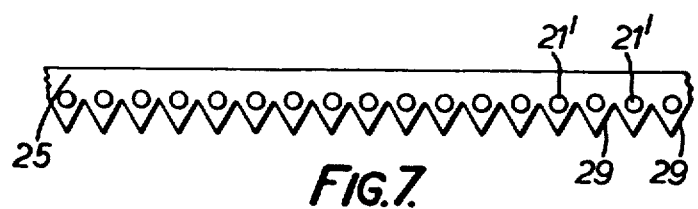
FIG. 7 is a side elevation of the portion of the loop illustrated in FIG. 6.

The meshing means need not be pins arranged on a flexible loop. For example, the meshing means and their supporting flexible loops may take the form of a flexible toothed belt, similar to the well-known timing belts, a length of which is illustrated in FIGS. 6 and 7. Such belt may be provided with a series of pin-like protrusions 21', which may be integrally formed with such belt or may be of different metallic or non-metallic material.

Figure 9:
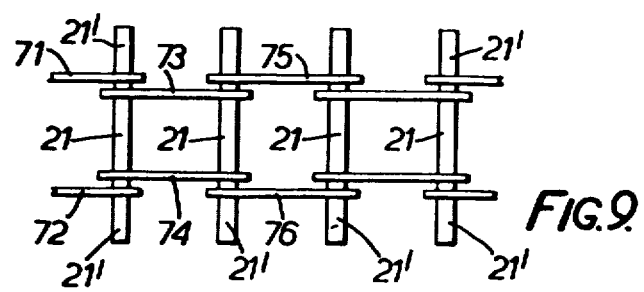
FIG. 9 is a front elevation of a section of a special rollerless chain being still another embodiment of a loop of the invention.
Figure 10:
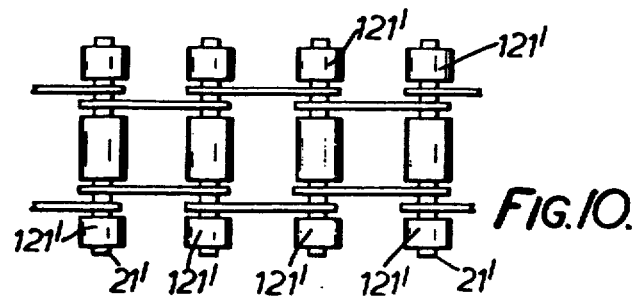
FIG. 10 is a front elevation of a section of a special roller chain.

In other constructions, the meshing means and their supporting flexible loops may comprise roller, or rollerless, chains of special construction and attributes, for example such as the special transmission chains illustrated in FIGS. 9 and 10.

Figure 3:
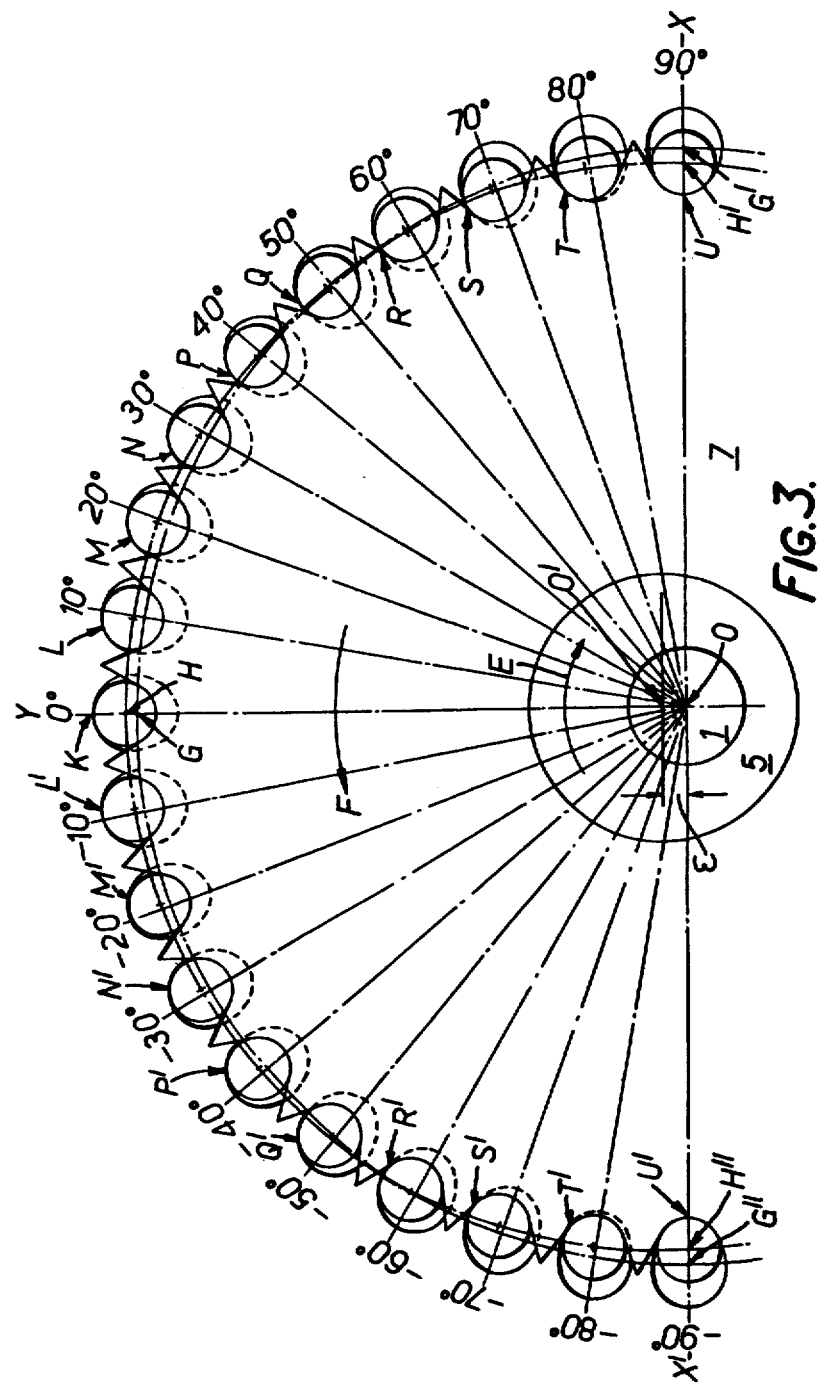
FIG. 3 is a diagram illustrating a pin-engaging cycle (from −90° to 0° and from 0° to 90°), at 10° intervals, showing the relative positions of the principal components of the invention, in particular the gear means, the meshing means, and the movement-limiting means.

FIG. 3 is an enlarged diagram illustrating the pin-engaging cycle at 10° intervals over 18°, (from −90° to +90°). It illustrates in some detail the relative positions of the gear means (gear teeth), the meshing means (pins of a flexible loop), and the movement-limiting means (engaging pins and capturing holes).

As abovestated, the axes of pins (meshing means) 21 are held apart at distances substantially equal to the pitch of gear 7 and, therefore, if the maximum eccentric movement is along axis OY, all teeth of gear 7 will mesh with pins 21 above the axis X—X', while they will progressively get out of mesh below it. As also abovestated, assuming that shaft 1 rotates in the direction of arrow E, gear 7 will eccentrically rotate in the opposite direction, i.e. that of arrow F, at a reduced speed.

Thus, all centres of pins 21 will lie on the gear 7 pitch circle H''-H-H40, i.e. a circle having radius O'H equal to the gear (or sprocket) Pitch Radius.

The capturing holes 41 will be equidistantly arranged about the centre of rotation O (of the input shaft 1), i.e. their design centres (the cross-section of lines a-b and c-d, see FIG. 2) wil all lie on circle G''-G-G' (which will be defined as the pitch line) having a radius OG, which radius OG will be defined as Pitch Radius-Plate.

The equations will be:

$$HG + GO = HO' + O'O$$

or $$P + Rp = Rs + \epsilon$$

or $$P + Rs - Rp + \epsilon$$

Where:
P = Pitch Line Distance (HG)
Rp = Pitch Radius-Plate
Rs = Pitch Radius-Sprocket
$\epsilon$ = Eccentricity Since the number of holes 41 equals the number of pins 21, which are, at least, one more than the number of teeth 31, different pins 21 will contact their capturing holes 41 at different points of contact (at any given instant of time). Under the conditions illustrated in FIG. 3 (i.e. at that instant), these points of contact, for successive pins (shown at 10° intervals), and within the quadrant YOX, are designated by:

K L M N P Q R S T U and within the symmetrical quadrant YOX' by:

K L' M' N' P' Q' R' S' T' U'

If one joins all these points with an imaginary line, one will obtain a wave-front and, when the gear 7 rotates, pins 21 will progressively change their points of contact along the periphery of their capturing holes 41 and, therefore, this wave-front will continuously move in the direction of arrow F.

It is important to note that while pins and teeth mesh above axis X—X' (i.e. substantially over 180°), only pins, teeth and holes, within YOX, are load-bearing (i.e. substantially within no more than a quadrant).

This is so because, if motion is the direction F, and at the instant considered in FIG. 3, load is transmitted only at points, K, L, M, . . . , T, U, while in the symmetrical quadrant YOX' the points of contact L', M', . . . etc. are obviously (as can be easily seen in the illustration of FIG. 3) at points along the hole's periphery where no load can possibly be transmitted.

For the above reasons the gearing principle of the invention may be referred to as "quadrant-wave drive".

Thus, taking into consideration the various parameters and by judical calculations, a shape of hole 41 may be arrived at which will include LOAD BEARING ENGAGEMENT of substantially up to a full quadrant, and therefore load bearing of up to one quarter of the total number of meshing means and teeth.

The enlarged FIG. 2 corresponds to the situation existing at 90° of FIG. 3, i.e. a pin is shown as captured in hole 41, point H' corresponding to the axis of pin 21.

Line c-d is the above referred to Pitch Line, which intersects at G' the radial centreline a-b.

The corresponding position of a pin 21 at 0° of FIG. 3, will be as illustrated by dotted lines in FIG. 2, point H being the axis of pin 21.

Figure 8:
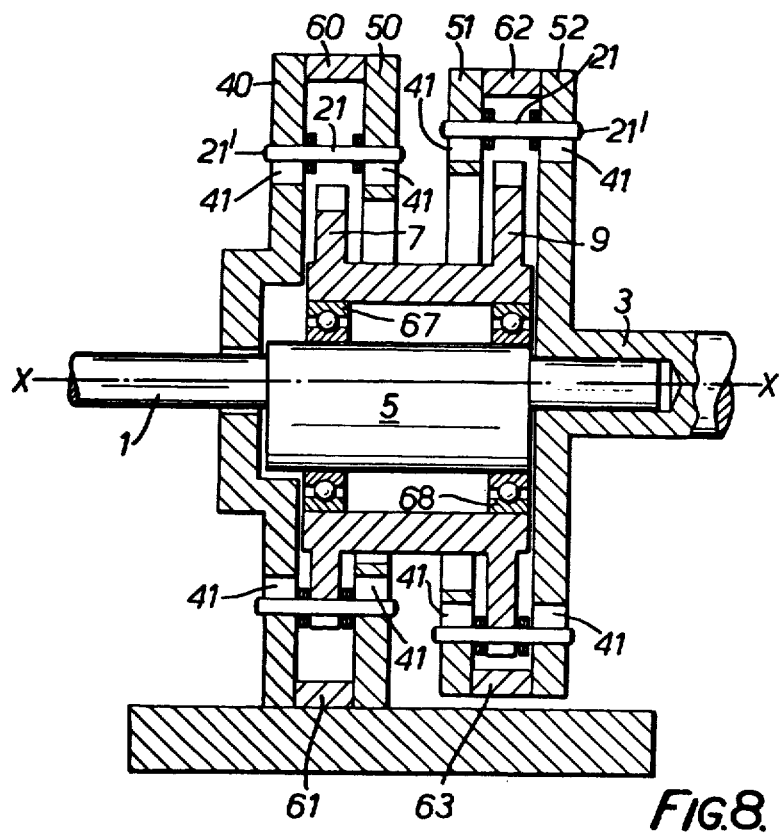
FIG. 8 is a cross-sectional view of a simple embodiment of a two-stage speed changing device according to the invention.

FIG. 8 illustrates, in a sectional view, a simple embodiment of the present invention utilising chain and sprocket wheel components (although the same arrangement may equally well employ different teeth meshing elements). Specifically FIG. 8 is a two-stage speed changing arrangement having two stationary datum plates 40 and 50 fixedly held apart for example by spacers 60 and 61. Plates 40 and 50 are similar to datum plate 40 illustrated in FIG. 1. The chain employed in this arrangement may be rollerless (for example as illustrated in FIG. 9), or it may be a roller chain, (such as that illustrated in FIG. 10). Assuming that a rollerless chain is employed and referring to FIG. 9, all the pins 21 extend beyond the link plates (such as link plates 71, 73, 75, 72, 74, 76), so that the extending lengths 21' protrude into pin capturing means such as the previously-described holes 41 formed in plates 40 and 50.

A second set of plates 51 and 52 fixedly held apart by spacers 62 and 63, rotates as one unit with the output shaft 3, which is fixedly secured thereto, about the axis of rotation X—X. As in the first stage, plates 51 and 52 of the second stage are formed with holes 41 restraining and guiding the movement of the ends 21' of the pins 21 of a second chain loop.

Both the input shaft 1 and the output shaft 3 are coaxially arranged, for independent rotation, about the common axis X—X. Eccentric 5 is fixedly secured about shaft 1, and journalled for rotation about eccentric 5 is the assembly of first stage gear 7 and second stage gear 9. Gears 7 and 9 are fixed to one another and are bearingly supported on eccentric 5, by means of bearings 67 and 68.

Essentially, each of the first and second stage assemblies is similar to that previously described in connection with FIG. 1, i.e. gear 7 eccentrically meshing with the first stage chain, and gear 9 also eccentrically meshing with the second stage chain, except that this second stage chain is contained for limited movement of each of its pins by the rotatable (about axis X—X') plates 51 and 52.

Whilst a two-stage device is described in conjunction with FIG 8, it is evident that a one-stage device is equally well possible simply by omitting the other stage.

THE PRESENT INVENTION

Flexible "toothed belts" of particular interest are novel forms of "inverted tooth chains" (otherwise also known as "silent chains").

Such novel forms constitute, in fact, one of the principal objects of the present invention, other objects being novel motion-transmitting devices.

A brief outline of the conventional "silent chain", according to prior art, is in order:

FIG. 11 is a front elevation of a single link, or element, of such silent chain, such link generally being designated by numeral 100.

As can be seen from FIG. 12, which is a top view, such link is of relatively small thickness, and is formed with two holes 114 and 115, through which pins 21 may be inserted, in order to hingendly interlink several such elements, successively to one another, as shown in FIG. 13. In this manner such a chain may very conveniently mesh with an appropriately shaped toothed gear (or rack), such as that designated by numeral 120. Since the thickness of individual links 100 may be small, several of them may be very conveniently assembled, parallel to one another, as shown in FIG. 14, so that their combined width offers a larger area of contact with a meshing gear or rack and thereby may withstand larger loads.

Generally, "silent chains", when modified according to the teachings of the present invention, have several advantages, and a number of embodiments of such modifications shall be described below, references being made to the accompanying figures.

EMBODIMENT A

This embodiment is shown in FIG. 17 and consists in modifying a silent chain, such as that shown in FIG. 14, by extending its pins 21, so that they may freely pass through the ovoid holes 41 (see FIGS. 1,2,3) of the datum plates 40 and 50, in the fashion and manner previously described. Further modifications will be described below.

(a) AREA CONTACT

While each link of a rollerless or roller chain can only have a line-contact with a meshing tooth (i.e. at Z on FIG. 15), an area contact is possible with a "silent chain" (see FIG. 13). Of course, an area contact is only possible by judicially choosing and designing the "included angle" $\alpha$ between flanks 111 and 113 of the link (see FIG. 11) and the corresponding included angle $\beta$ of the gear or rack (see FIG. 13).

Generally, the system of gearing is developed from a basic rack 120 having straight (flat) sided teeth, inclined at a standard pressure angle $\gamma$.

(b) NO SLIP

It is interesting and important to note that, in applications according to the present invention, a chain is essentially not in tension, and remains at all times arranged along (almost) a circular path. That is, observing FIG. 1, it is wrapped around the gear in the two upper (engaging) quadrants and only slightly departs from a circular path in the lower two quadrants. (This is quite different from conventional chain applications, where a chain, upon disengagement, moves along a linear path).

If we now substitute the chain of FIG. 14 in place of the pins 21 in FIGS. 1 and 3 (after appropriately modifying the shape of the sprocket teeth 31 in order to maintain the desired "Area Contact"—see (a) above), it will become evident that, once in mesh (i.e. along the upper—or engaging—two quadrants), the teeth of the silent chain and the sprocket, will continuously remain in contact (i.e., in effect, virtually "locked", or "frozen", in contact). That is, we maintan, not only AREA CONTACT, but also NO SLIP conditions, which is an extremely desirable mode.

(c) ABSENCE OF BENDING MOMENTS

In the various embodiments of our abovementioned previous invention, when a rollerless or roller chain was employed, for example such as those illustrated in FIGS. 9 and 10, forces were producing a cantilever effect, which could bend the pins 21. This can be clearly seen in FIG. 16, where the forces F1 (exerted by the ovoid holes in datum plates 40 and 50) and F2 (exerted by sprocket 7) could bend shaft 21. Since the side plates 71,73,72,74 have a definite thickness, no matter how thin they are made, the cantilever effect will persist.

However, with a "silent chain" arrangement, there are no distinct side plates and, therefore, the chain and the datum plates may be entirely juxtaposed without any appreciable distance between them. This arrangement is clearly shown in FIG. 17, where the chain's outermost links 100 are immediately against the datum plates 40 and 50, there being substantially only a shearing force on the pins 21, which shearing force such pins can much better withstand than bending forces.

(d) DECREASE IN PRESSURE ANGLE ($\gamma$) (and increase of positive meshing in quadrant)

There is a further advantage in using "silent chains", when further modified in the manner that will now be described:

By studying FIG. 3, one will observe that, depending upon the degree of rotation in the "power quadrant", i.e. 0° to 90°, the resultant of the combined forces exerted by the ovoid holes and the sprocket teeth, will force a pin 21 (i.e. a meshing element) radially inwardly or radially outwardly. The radially inward forces (implosive or centripetal forces) are resisted by the sprocket and hold pins and sprocket firmly against one another, but the radially outward forces (explosive or centrifugal) tend to force the pins 21 away from the sprocket, which is a very undesirable effect. By judicial design of the sprocket (gear) teeth, this lifting effect may be minimized, but it always remains a problem.

A further modification of the "silent chains" can be extremely rewarding in overcoming this troublesome "lifting-away" problem. Thus:

The standard commercial "silent chain" has an Included Angle $\alpha = 60°$, which corresponds to a Pressure Angle $\gamma = 30°$ on a rack.

However, in applications according to the present invention, there is every reason to depart from this standard Included Angle and corresponding Pressure Angle. In fact, in applications according to the present invention, and in order to minimize the "lifting-away" problem (by "locking" or "freezing" the chain-to-gear meshing contact), it would be desirable to have a Pressure Angle $\gamma = 0°$ (see FIG. 18) or even negative, i.e. $\gamma < 0°$ (see FIG. 19). Negative Pressure Angles ($\gamma < 0°$) require further modifications in the design of chains and/or would appear that the links 100 (see FIG. 19) will not easily swing arcuately about the hinge (i.e. pin 21) in order to disengage.

But it is easy to approach the $\gamma = 0°$ condition, as shown for example in FIG. 20, which illustrates a novel, according to the teachings of the present invention, 20-tooth, $\frac{1}{2}''$ pitch, sprocket, modified to an included angle 40° and a pressure angle of only 2°. The meshing chain-link has also an included angle 40° and, as can be seen, may easily "swing" about it's hinge (pin) in order to disengage.

In fact, to simplify the manufacturing process, a simple "recess" cutter (or die) may be employed, having a shape as shown in FIG. 21, and such cutter or die, only "cutting away" or "stamping away" the recess space between teeth, the actual teeth taking any shape, for example, as shown in FIG. 20.

(e) ROLLERS

It is evident that, unlike the roller-chain of FIG. 10, no inboard rollers (i.e. rollers meshing with sprocket) are necessary, while outboard rollers 121 (i.e. rollers rolling in ovoid holes) may be used, if preferred.

EMBODIMENT B (leafing, single tier)

In the abovedescribed Embodiment A, the bending moments in the pins of chains was substantially eliminated and virtually simple shear forces substituted. Clearly, shear forces are exerted on the pins, between the datum plates 40 and 50 and the outermost surfaces of the outermost chain links 100 (see FIG. 17).

Figure 22:
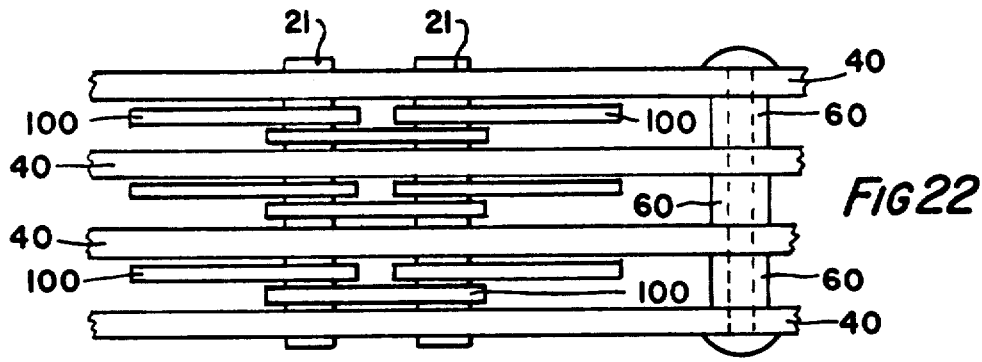
FIG. 22 is a plan view of another form of chain and datum plates used in the present invention.

FIG. 22 illustrates the Embodiment B, according to which several datum plates 40 and chain links 100 may be very conveniently interleafed thus further distributing forces and loads.

The datum plates 40 may be spaced apart at the required distance by any convenient means, for example by means of spacers 60.

EMBODIMENT C (Two-tier links)

By observing again FIG. 11, it can be seen that if the internal faces 110 and 112, of a link 100, can have the same Pressure Angle as that of the external faces 111 and 113 (so that both faces 113 and 110 contact and mesh with sprocket or gear-teeth), the pins 21 of Embodiments A and B will in fact be only subjected to shear forces and already stated. However, it is usually convenient, or necessary, to relieve the internal faces 110 and 112, so that they do not come in contact, and therefore do not mesh, with teeth. In such a case, a bending moment on the pin is—of course—again possible. Increasing the diameter of the pin 21 will increase its strength but, again, this is not possible, as by so doing, it is also necessary to increase the size of the ovoid holes 41 to a point where there is hardly any material left between successive ovoid holes 41.

Figure 23:
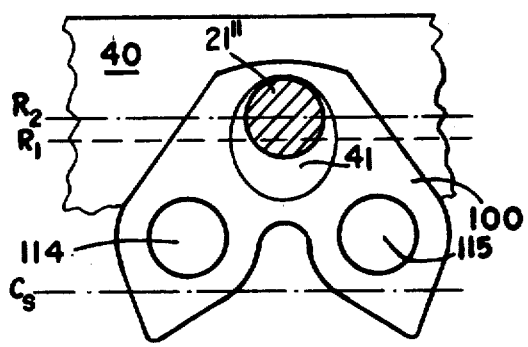
FIGS. 23 and 24 are diagrams showing a chain link and part of a datum plate together with an engaging means in one form of chain.
Figure 24:
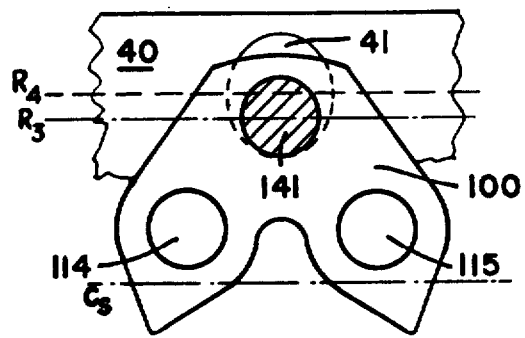

The solution is the following important teaching of the present invention: "Two-tier Links" may be advantageously employed, and such novel two-tier links will now be described: Referring to FIG. 23 and FIG. 24, the "lower tiers" have the usual holes 114 and 115, through which the usual pins 21 freely pass, in order to hingendly interlink successive links. The upper tier, on the other hand, may alternatively be: As in FIG. 23, in which an ovoid hole 41 is formed in the link. In this case a separate pin 21″ may freely pass through this ovoid hole 41, this pin being firmly held on datum plate 40 or, alternatively, journalled for free rotation in the datum plates (such as datum plates 40, except that, in this case, the datum plates 40 have no ovoid holes, but simply circular holes through which the separate pins 21″ are journalled). Or, as in FIG. 24, in which the link is formed with a circular hole 141, through which a separate pin is journalled (or firmly held), the ovoid holes 41 being formed on the datum plates (such as plate 40). In either case (FIG. 23 or 24), the function of holding the links together is separated from the movement-limiting means and since the radial distance of the ovoid 41 (of FIG. 23), or the ovoid 41 (of FIG. 24) is greater than the radial distance of holes 114 and 115—from the center of the rotating input shaft—it is possible to increase the diameter of such separate pin, to better withstand bending moments.

EMBODIMENT D (Interleafed, two-tier links)

This embodiment actually consists of combining the features of the previously described Embodiment B and C.

In other words combining the interleafing datum plates 40 (see FIG. 22), as described in Embodiment B, with the two-tier arrangements of FIGS. 23 and 24, of Embodiment C.

Such arrangement insures a better distribution of all forces and results in a much stronger torque converter.

EMBODIMENT E (Double Ovoids)

In the previously described embodiments, when the forces exerted on the pins (by the teeth, links, and ovoid holes) are analyzed, it becomes evident that it is impossible to maintain pure rolling motion of the pins within the ovoid holes. Therefore, it is advisable to place rollers around the protruding ends of such pins (i.e. about the portion that enters, and engages, the ovoid holes). When this is done, a serious problem arises, because to accommodate the rollers, within the maximum permissible size of ovoid holes, the diameter of the pins must—of course—be correspondingly reduced which, in turn, decreases their strength.

Figure 25:
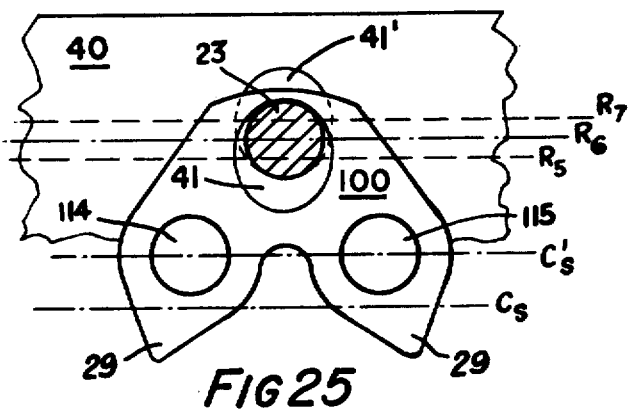
FIG. 25 is a view similar to FIGS. 23 and 24 showing another form of chain link with ovoid holes in the link and datum plate.
Figure 26:
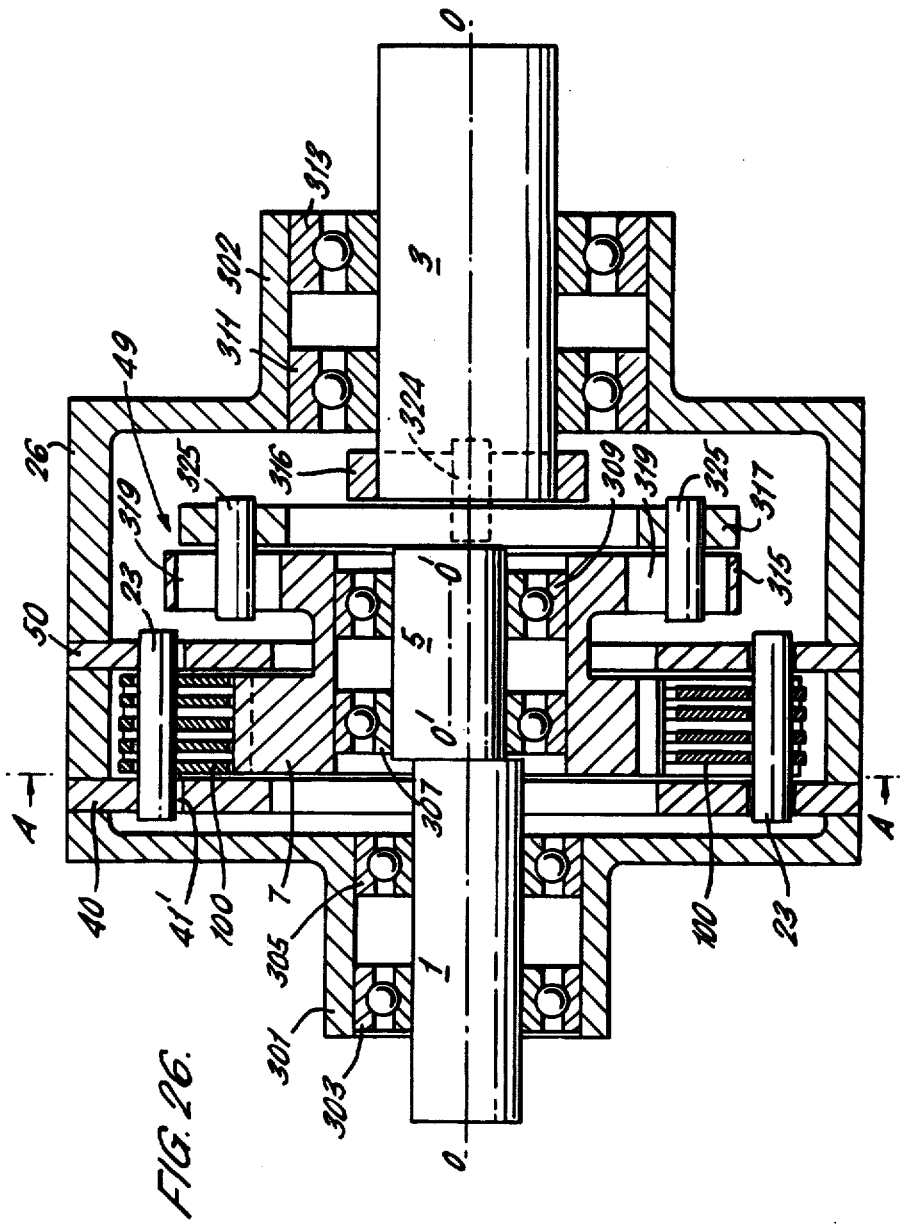
FIG. 26 is a cross-sectional view of a particularly useful embodiment of a torque converter according to the invention, the section being along line B—B of FIG. 27.

In order to circumvene the above and, in fact, increase the strength of the pins (by increasing their diameter substantially) and eliminate the rollers while maintaining pure rolling motion, the following DOUBLE OVOID improvement will be taught, reference being made to FIGS. 25, 26 and 27.

As it can be seen, the links 100 are formed with ovoid holes 41 somewhat similar to that of FIG. 23, and as previously described in Embodiment C. But the datum plate 40 is also formed with an ovoid hole 41′. Both ovoids 41 and 41′ are engaged by a roller 23. Having two ovoid holes, their dimensions must be correspondingly reduced (for example, refering to FIG. 2, the dimension ab less the pin diameter will be approx. halved, cd less the pin diameter will also be halved etc.). Furthermore, in order to maintain rolling motion of the roller 23 and since the ovoid holes are not circular (nor necessarily symmetrical about their cd axis—see FIG. 2), one set of ovoid holes 41′ must be inverted relatively to the other ovoid hole 41, as shown in FIG. 25.

As it can be seen, in the present embodiments, the function of holding the links together is separated from the movement-limiting means and since the radial distance of the ovoid holes 41 in the links, or the ovoid holes 41′ in the datum plate, is greater than the radial distance of holes 114 and 115 from the axis O of the input shaft 3 (see FIG. 2) it is possible to increase the diameter of the separate rollers 23 to better withstand the loads. Nevertheless, it is evident that the sizes and shapes of the two ovoid holes 41 and 41′ may be different but, in such cases, there will be no more pure rolling motion of rollers 23, as long as such rollers 23 are of uniform diameter. Nevertheless, it is still possible to maintain pure rolling motion of rollers 23 if such rollers 23 are of stepped diameter, with different diameter portions engaging different-sized ovoid holes 41 and 41′.

To sum it up, double ovoid holes according to this embodiment of the invention have several advantages, including the following:

(1) Without journal bearings, rollers 23 may have a pure rolling motion;

(2) By not having journalled bearings around the rollers 23, their diameter may be increased, thereby adding to their capacity to withstand high loads;

(3) By having smaller ovoid holes on the datum plate 40, the size of adjacent ovoid holes may be increased allowing, in turn, even further increase in the diameter of the rollers 23, thus still further increasing their strength;

(4) The multiple separation of functions allows considerable design freedom, permitting the optimisation of shapes, sizes and locations of pins 21, rollers 23, ovoids 41 and 41', gear-teeth 31, link-teeth 29, and other components.

FIGS. 26 and 27 illustrate an embodiment of the invention employing the double ovoid principle.

The housing is designated by numeral 26 and it is formed at one end with a cylindrical collar 301 which supports rotatably by means of bearings 303 and 305 the input shaft 1 whose central longitudinal axis is O. Fixedly and eccentrically secured to input shaft 1 is eccentric 5 which is a cylindrical shaft having a central longitudinal axis O', the eccentricity being the distance O—O'. A sprocket or gear 7 is journalled for free rotation about eccentric 5 by means of bearings 307 and 309. The gear 7 meshes with a series of meshing elements, each being substantially similar to the previously described special link of the invention designated by numeral 100 in FIG. 25. All such links 100 are hingedly interconnected by the pins 21 as shown in FIG. 27, thus forming an endless flexible transmission member or flexible transmission loop as previously described. Two stationary datum plates 40 and 50 are formed with a series of ovoid holes 41', while each link 100 is formed with another ovoid hole 41 so that ovoid holes 41 and 41' are engaged by rollers 23 (in the manner shown in FIGS. 25 and 27).

Since the gear 7 rotates eccentrically, its gyratory motion must, in most cases, be converted to a pure rolling motion and this may be accomplished in several ways, one being the Oldham coupling generally designated by numeral 49. Thus, fixedly supported to gear 7 (or an integral part thereof) is the plate or disc member 315 having the usual radially oriented slots 319. A second disc or annular member 317 fixedly supports two pins or rollers 325 which engage the above-mentioned slots 319 in member 315. Member 315 also supports a second set of pins or rollers 324 arranged 90° apart from pins or rollers 325. These pins 324 engage, in turn, radially oriented slots on third disc or plate 316 which is fixedly secured to output shaft 3. (The Oldham coupling being a well known device needs no further description). The output shaft 3 is bearingly supported by means of roller bearings 311 and 313 to the collar 302 of the housing 300.

In all other respects, the general manner of operation of the device is similar to the devices previously described in considerable detail with reference to FIGS. 1 through 10.

EMBODIMENT F (Double ovoids plus leafed datum plates)

The double ovoid concept of Embodiment E may be combined with the leafing concept of Embodiment B and D.

Thus, links such as those illustrated in FIG. 25 and described in Embodiment E, may be very conveniently interleafed with datum plates (as described in Embodiment B and D, with corresponding substantial advantages).

EMBODIMENT G (Bridging Members)

Although mention has been made more particularly of arrangements with a chain around a sprocket, as has been explained in the aforementioned specification, the wheel may have inwardly directed teeth, with the meshing means inside the wheel. The double ovoid technique can be applied to such configurations. As will be explained later, chain constructions can be used in which the chain is outside the sprocket but in which the ovoids lie radially inwardly of the pins connecting the chain links. Thus, considered more generally, in two-tier chains, of either the single ovoid or double ovoid type, the ovoids may lie radially inwardly of the pins connecting the chain plates, instead of radially outwardly as shown in FIG. 25.

In the above-described device, the meshing means were formed with meshing elements generally made up of a series of links, such as links 100. These links 100 were hingedly interlinked to one another by means of pins through the holes 114,115 of FIG. 25. The engaging or capturing means, constituting the movement limiting means, were directly supported by or formed on, such links. However this is not mandatory, that is, the meshing elements may be formed to engage only a toothed wheel, while a "bridging member" may support these meshing elements and the engaging or capturing means. Such a separation of functions has definite advantages and an arrangement incorporating such a separation of functions will now be described, reference being made to FIGS. 28, 29 and 30.

A series of links 260 are hingedly interlinked by means of pins 261, thus forming a "silent chain". In this instance, however, the pins 261 extend beyond the chain assembly so that their protruding ends may be very conveniently supported by a "bridging member" 259. This bridging member has four downwardly extending flanges 263 and 264, so that two of them, designated by numeral 263, support between them the pins 261. To do so, these flanges 263 are formed with holes 262 in which the pins 261 may be a press fit. The other two downwardly extending flanges 264 are spaced outwardly from flanges 263, and are formed with holes 265 through which the pins 261 may freely pass. In addition, each pair of flanges 263 and 264 are formed with ovoid holes 266 for carrying a roller 267 which engages in an ovoid hole 268 in a datum plate 269, in the manner previously described in connection with FIG. 3.

The two datum plates 269 may be rigidly connected to one another in any convenient way, for example by means of external bridge 270, spacers 272 and bolts 273.

As can be better seen in FIG. 29 each bridging member 259 supports two pins 261, which in turn support a set of links 260. Each bridging member 259 is connected to the following bridging member 259 by means of an interleafed set of links, in the usual manner of silent chains. In other words there is one bridge for every second set of parallel banks of links 261 and, likewise, there is one set of movement limiting means (rollers 267 and ovoids 266–268) for every second set of parallel banks of links 260. Where it is desirable to have one set of movement limiting means for every parallel bank of links 260, half ovoid holes may be formed at the edges where two bridging members 259 abut against one another, such arrangement being illustrated in FIG. 30 which shows two bridging members 259 and 259', each having half an ovoid hole 267' on its right and left edge. The two abutting edges form between them a single complete ovoid hole.

The links 260 have teeth for engaging a sprocket, or a toothed wheel, in the manner previously described.

It must be noted that the actual location of the design centres of ovoid holes 266, 268 may be radially inwardly or radially outwardly of the pins 261, a radially inwardly location being shown in FIGS. 28, 29 and 30.

INTERSECTING CIRCLES IN CONVENTIONAL GEARING

As it is well known, in conventional gearing, the pitch circles of two meshing gears meet tangentially, i.e. MEET AT ONE AND ONLY ONE POINT. This is the reason that in such systems, one, or at best a few, teeth carry all the load. IN QUADRANT DRIVES: i.e. in devices according to the present invention (and the prior U.S. Pat. No. 4,023,440 by the same inventors), the pitch circles between the Action and Reaction elements INTERSECT AT TWO POINTS and it is due to this unusual effect that multitooth engagement is possible.

This intersection of the pitch circle is in turn—possible because THREE rather than TWO meshing members are provided, that is:

in a gearing arrangement involving two conventional meshing gears, one of the two gears is replaced, according to the invention, by two sets of means, namely:

one set of meshing elements (pins 21)

one set of movement-limiting means (ovoid holes 41 in a datum plate 40 and pins or rollers 23).

Thus the sprocket 7 constitutes the Action element and the ovoid holes 41 (on datum plate 40) the Reaction element, the meshing elements (pins 21) providing the necessary inter-connection between the Action and Reaction elements.

In torque converters described in connection with FIG. 3, the two intersecting circles are:

(1) Circle H''-H-H' which we shall designate as $C_s$ has a radius $O'H = R_5$ equal to the Pitch Radius of the sprocket 7.

It must be noted that in the engaging two quarters, i.e. those illustrated in FIG. 3, the centres of all pins 21 (i.e. the meshing elements) also lie on the same circle H'-H-H'.

(2) Circle G''-G-G' which we shall designate as $C_p$ (on which lie all the "design centres" of the ovoid holes 41—i.e. the cross-sections of lines a-b and c-d of FIG. 2) which has a radius $OG = R_p$ and which was defined as Pitch Radius-Plate.

These two circles $C_s$ and $C_p$ always intersect one another at two points, and, as above-mentioned it is due to this intersection that engagement is possible over such a large area.

It must be noted that the ovoid holes 41 provide a "lost motion" between the Action element (sprockets 7) and the Reaction element (ovoid holes 41), this lost motion making possible the abovementioned intersections at two points of Pitch Circles $C_s$ and $C_p$.

In the Embodiment A (see FIG. 20) according to the present invention there is a separation of functions, i.e. the function of the combined pins 21 and their ends 21' of the embodiment illustrated in FIGS. 1, 3 and 6, is now split in two: The teeth of the silent chain mesh with the gear 7, while the totally separate pins 21 engage the ovoid holes 41 on the datum plate 40.

The design centres of the ovoid holes 41 lie on pitch Circle $C_p$ (having a centre equivalent to the center O of FIG. 3). But whilst the teeth on chain links 100 are in meshing engagement with the gear 7, there is no relative movement between the gear and the chain-links and, therefore, the Gear's Pitch Circle $C_s$ may be transposed, for analysis purposes, on Circle $C'_s$, $C'_s$ being the locus of the centres of pins 21 (both $C_s$ and $C'_s$ having the same centre, equivalent to the centre O' of FIG. 3).

Since Gear 7 eccentrically gyrates, $C_s$ and $C'_s$ also eccentrically gyrate with it and, therefore, Circles $C_p$ and $C'_s$ intersect one another at two points, equivalent to those illustrated in FIG. 3.

In the Embodiment C (two-tier links, FIGS. 23 and 24), Circles $R_2$ and $R_4$ are the locus of centres of stationary pins (Circle $R_2$) and stationary ovoids (Circle $R_4$) on datum members 40. Whilst the teeth on the chain links 100 are in meshing engagement with the gear 7, there is no relative movement between the gear and the chain links and therefore the Gear's Pitch Circle $C_s$ may be transposed, for analysis purposes, on Circle $R_1$ (in FIG. 23) and Circle $R_3$ (in FIG. 24). But since the gear 7 eccentrically gyrates, so does Circles $R_1$ and $R_3$ and, therefore, Circles $R_1$ and $R_2$ (of FIG. 23) and Circles $R_3$ and $R_4$ (of FIG. 24) intersect one another at two points, equivalent to those illustrated in FIG. 3.

In the Embodiment E (Double ovoids, FIG. 25 - also FIGS. 26 and 27), we have double ovoids, therefore two lost motions and therefore three intersecting circles $R_5$, $R_6$ and $R_7$. More explicitly, whilst the teeth on the chain links 100 are in meshing engagement with the gear 7, there is no relative movement between the gear-teeth and the chain-links and the Gear's Pitch Circle $C_s$ may be transposed, for analysis purposes, to circle $R_5$ (centre of ovoid holes on links 100) and since the gear 7 eccentrically gyrates, so does circle $R_5$. Circle $R_7$, being the locus of the stationary ovoids on the datum member 40, is stationary. The rollers 23 however, whilst drivingly engaged, having centres whose locus is disposed along the arc of a third circle $R_6$ which also eccentrically gyrates together with Circle $R_5$ and, consequently, both Circles $R_5$ and $R_6$ eccentrically gyrate with respect to Circle $R_7$, each intersecting this Circle $R_7$ at two points (equivalent to those illustrated in FIG. 3), the actual location of which moves gradually through the cycle of operation.

In fact, when a condition of pure rolling motion (of rollers 23 within the double ovoids 41 and 41') exists, all three circles $R_5$, $R_6$ and $R_7$ intersect one another at the same points, as shown in FIG. 27.

It must be noted that whilst the teeth on the chain-links 100 are in meshing engagement with the gear 7, (that is above axis X—X' of FIG. 2) since there is no relative movement between gear-teeth and the chain links, the three circles $C_s$, $C'_s$ and $R_5$ are all concentric circles with centres at O'.

GENERAL REMARKS AND COMMENTS

Although in explaining the operation of the invention, reference has been made to a construction having ovoid holes, it will immediately be appreciated that this is merely a convenient form of apertures but, in fact, not only apertures but any convenient, or desired, form and shape of first profiles on the datum means and/or second profiles on the links 100, may be chosen, as dictated by design considerations. Such profiles will contain and guide the rollers 23 and, furthermore, in operation, the full peripheries of such ovoid holes, or first and second profiles, are not employed, because rollers 23 (or pins 21) are only in engagement substantially only during one half of a full cycle and are in driving engagement only during one quadrant of a full cycle. Therefore, it is only appropriate portions of the profiles that are effective (and of which the shaping is required) to control the movement of the connector elements, such as rollers 23 or pins 21. It is convenient however to have closed profiles since these profiles can then serve better as capturing means to retain the rollers in the assembly.

It is in general preferable to have the difference between the number of teeth on the links and on the gear small. A unity difference is employed in the example described. It is possible however to employ a greater difference. Also, although links with two teeth have been described, it is possible to employ links with more than two teeth.

Generally, in all the embodiments of the invention disclosed herein, as well as in all the devices disclosed herein, it will be understood that the shape, size, configuration, etc. of any of the various parts, elements, components and assemblies, as well as arrangements for supporting them, mounting them, connecting them, etc., it is not intended to exclude any modification, change, alternative arrangements, etc., which fall within the scope of the present invention.

We claim:

1. A motion transmitting device including eccentric means, wheel means having portions shaped to engage with linked but independently movable meshing elements, and movement-limiting means including a datum member, wherein said eccentric means is arranged to cause said meshing elements sequentially to enter into and subsequently to move out of engagement with said portions of said wheel means, said meshing elements being individually guided by said movement-limiting means within predetermined limits or orbital motion relative to said datum member such that a plurality of adjacent areas of said meshing elements are always simultaneously in engagement with, and stationary relative to, a corresponding number of said portions, said movement-limiting means including a plurality of individual connector elements, first profiles on said datum member and second profiles on said meshing elements, each of said connector elements being in engagement with respective said first and said second profiles to be held in captive dependency, the profiles constraining the engaging meshing elements to follow said orbital motion.

2. A motion transmitting device as claimed in claim 1 wherein each connector element is shaped to roll along its associated first profile and its associated second profile.

3. A motion transmitting device as claimed in claim 2 wherein each connector element is a cylindrical element of uniform diameter.

4. A motion transmitting device as claimed in any of the preceding claims wherein said movable meshing elements together comprise an endless transmission loop of flexible material.

5. A motion transmitting device as claimed in claim 1 wherein said movable meshing elements together comprise a plurality of hingedly connected links, each with two teeth.

6. A motion transmitting device as claimed in claim 1 wherein each of said first and said second profiles are a guide surface in the form of a closed loop.

7. A motion transmitting device as claimed in claim 5 wherein an even number of links is provided in the transmission loop and wherein each alternate link is rigidly secured to a link carrier.

8. A motion transmitting device as claimed in claim 7 wherein a guide surface in the form of a closed loop is provided on each link carrier to constitute one of said second profiles.

9. A motion transmitting device as claimed in claim 8 wherein each carrier has two further part profiles arranged so that the two part profiles on adjacent carriers together form a closed loop profile, constituting one of said second profiles, for a further connector element engaging a first profile on the datum member.

10. A motion-transmitting device as claimed in claim 5 wherein each of said first profiles on said datum member is a guide surface in the form of a closed loop.

11. A motion-transmitting device as claimed in claim 10 wherein each of said first profiles has a design centre and all such design centres lie on the circumference of a circle.

12. A motion-transmitting device as claimed in claim 6, wherein said closed loop profiles are of ovoid form.

13. A motion-transmitting device including:
(a) eccentric means;
(b) meshing means in the form of a chain-loop of links, each of said links formed with two tooth-like profiles;
(c) said links hingedly connected by pins which extend outwardly from said links;
(d) gear means formed with teeth complementary to said profiles;
(e) a datum member formed with apertures of predetermined shape, each aperture loosely engaging in captive dependency one of said pins;

wherein said eccentric means is disposed to cause several of said tooth-like profiles to sequentially perform a wobbling motion in and out of meshing engagement with successive said teeth of said gear means, while each said link is guided within specific limits of said wobbling motion by said pins engaging within said apertures.

14. A motion-transmitting device including:
(a) eccentric means;
(b) meshing means in the form of a chain-loop of links each of said links formed with two tooth-like profiles;
(c) said links hingedly interconnected to one another by pins;
(d) gear means formed with teeth complementary to said profiles;
(e) said links formed with apertures of predetermined shape;
(f) a datum member having a series of connector elements each of said connector elements loosely engaging in captive dependency within one of said apertures;

wherein said eccentric means is disposed to cause several of said tooth-like profiles to sequentially perform a wobbling motion in and out of meshing engagement with successive said teeth of said gear means, while each said links is guided within specific limits of said wobbling motion by said connector elements engaging within said apertures.

15. A motion-transmitting device including:
(a) eccentric means;
(b) meshing means in the form of a chain-loop of links, each of said links formed with two tooth-like profiles;
(c) said links hingedly interconnected by pins;
(d) gear means formed with teeth complementary to said profiles;
(e) connector elements outwardly extending from said links;
(f) a datum member formed with apertures of predetermined shape, each aperture loosely engaging in captive dependency one of said connector elements;

wherein said eccentric means is disposed to cause several of said tooth-like profiles to sequentially perform a wobbling motion in and out of meshing engagement with successive said teeth of said gear means, while each said links is guided within specific limits of said wobbling motion by said connector elements engaging within said apertures.

16. A motion-transmitting device including:
    (a) eccentric means;
    (b) meshing means in the form of a chain-loop of links each of said links formed with tooth-like profiles;
    (c) said links hingedly interconnected to one another by pins;
    (d) gear means formed with teeth complementary to said profiles;
    (e) said links formed with first apertures of predetermined shape;
    (f) a datum member formed with second apertures also of predetermined shape;
    (g) individual connector elements, totally separate from one another, each engaged in loose captive dependency within said first and said second apertures;

wherein said eccentric means is disposed to cause several of said tooth-like profiles to sequentially perform a wobbling motion in and out of meshing engagement with successive said teeth of said gear means, while each said links is guided within specific limits of said wobbling motion by said connector elements engaging within said first and second apertures.

17. A motion-transmitting device including:
    (a) eccentric means;
    (b) meshing elements in the form of a chain-loop of links, each of said links formed with tooth-like first profiles;
    (c) said links hingedly connected to one another by pins which extend outwardly from said links;
    (d) wheel means having portions shaped to engage with said first tooth-like profiles;
    (e) a datum member formed with second profiles of predetermined shape, each of said second profiles engaging always the same one of said pins to be held in captive dependency;

wherein said eccentric means is arranged to cause several of said tooth-like first profiles to sequentially enter into and subsequently to move out of engagement with said portions of said wheel means, said meshing elements being individually guided by said pins engaged by said second profiles within predetermined limits of orbital motion relative to said datum member, such that a plurality of adjacent said tooth-like first profiles of said meshing elements are always, simultaneously in engagement with, and stationary relative to, a corresponding number of said portions.

18. A motion-transmitting device including:
    (a) eccentric means;
    (b) meshing means in the form of a chain-loop of links, each of said links formed with tooth-like profiles;
    (c) said links hingedly connected by pins which extend outwardly from said links;
    (d) gear means formed with teeth complementary to said profiles, said teeth defining a first pitch-circle about a first axis;
    (e) a datum member formed with apertures of predetermined shape, each aperture loosely engaging in captive dependency one of said pins, each of such apertures having a design centre and all such centres arranged on a second circle about a second axis;

wherein said eccentric means is disposed to cause each of said profiles to become engaged with, and subsequently to become dissociated from, said teeth, whilst said profiles are individually guided by said pins engaged in said apertures within specific limits of movement relative to said datum member, such that always a plurality of adjacent ones of said profiles are simultaneously in engagement with, and stationary relative to, a corresponding number of said teeth, and that the total movement relative to said datum member of each of said profiles, whilst it is drivingly engaged with one of said teeth, follows an orbital locus; the axis of the pins of those links whose profiles are stationary relative to a corresponding number of said teeth all lying on the arc of a third circle which is concentric with said first pitch-circle; said second and third circles intersecting one another at two points.

19. A motion-transmitting device including:
    (a) eccentric means;
    (b) meshing means in the form of a chain-loop of links each of said links formed with tooth-like profiles, said teeth defining a first pitch-circle about a first axis;
    (c) said links hingedly interconnected to one another by pins;
    (d) gear means formed with teeth complementary to said profiles;
    (e) said links formed with apertures of predetermined shape;
    (f) a datum member having a series of connector elements each of said connector elements loosely engaging in captive dependency within one of said apertures, each of such connector elements having a longitudinal axis and all such axes arranged on a second circle about a second axis;

wherein said eccentric means is disposed to cause each of said profiles to become engaged with, and subsequently to become dissociated from, said teeth, whilst said profiles are individually guided by said connector elements engaging in said apertures within specific limits of movement relative to said datum member, such that always a plurality of adjacent ones of said profiles are simultaneously in engagement with, and stationary relative to, a corresponding number of said teeth, and that the total movement relative to said datum member of each of said profiles, whilst it is drivingly engaged with one of said teeth, follows an orbital locus; each of said apertures having a design centre, the design centres of those links whose profiles are stationary relative to a corresponding number of said teeth all lying on the arc of a third circle which is concentric with said first pitch-circle; said second and third circles intersecting one another at two points.

20. A motion transmitting device including:
    (a) eccentric means;
    (b) meshing means in the form of a chain-loop of links, each of said links formed with tooth-like profiles;
    (c) said links hingedly interconnected by pins;
    (d) gear means formed with teeth complementary to said profiles, said teeth defining a first pitch-circle about a first axis;
    (e) connector elements outwardly extending from said links;

(f) a datum member formed with apertures of predetermined shape, each aperture loosely engaging in captive dependency one of said connector elements, each of such apertures having a design centre and all such design centres arranged on a second circle about a second axis;

wherein said eccentric means is disposed to cause each of said profiles to become engaged with, and subsequently to become dissociated from, said teeth, whilst said profiles are individually guided by said connector elements engaging in said apertures within specific limits of movement relative to said datum member, such that always a plurality of adjacent ones of said profiles are simultaneously in engagement with, and stationary relative to, a corresponding number of said teeth, and that the total movement relative to said datum member of each of said profiles, whilst it is drivingly engaged with one of said teeth, follows an orbital locus; each of said connector elements having a longitudinal axis, said longitudinal axes of said connector elements being on those links whose profiles are stationary relative to a corresponding number of said teeth all lying on the arc of a third circle which is concentric with said first pitch-circle; said second and third circles intersecting one another at two points.

21. A motion-transmitting device including:
(a) eccentric means;
(b) meshing means in the form of a chain-loop of links each of said links formed with tooth-like profiles;
(c) said links hingedly interconnected to one another by pins;
(d) gear means formed with teeth complementary to said profiles, said teeth defining a first pitch-circle about a first axis;
(e) said links formed with first apertures of predetermined shape, each of said first apertures having a first design centre;
(f) a datum member formed with second apertures also of predetermined shape, each of said second apertures having a second design centre all such second design centres arranged on a second circle about a second axis;
(g) individual connector elements, totally separate from one another, each engaged in loose captive dependency within said first and said second apertures, each of said connector elements having a longitudinal axis;

wherein said eccentric means is disposed to cause each of said profiles to become engaged with, and subsequently to become dissociated from, said teeth, whilst said profiles are individually guided by said connector elements engaging said first and said second apertures within specific limits of movement relative to said datum member, such that always a plurality of adjacent ones of said profiles are simultaneously in engagement with, and stationary relative to, a corresponding number of said teeth, and that the total movement relative to said datum member of each of said profiles, whilst it is drivingly engaged with one of said teeth, follows an orbital locus; said first design centres on those links whose profiles are stationary relative to a corresponding number of said teeth all lying on the arc of a third circle which is concentric with said first pitch-circle; said second and third circles intersecting one another at two points; said longitudinal axes on those links whose profiles are stationary relative to a corresponding number of said teeth all lying on the arc of a fourth circle; any two of the said second, third and fourth circles intersecting one another at two points.

22. A motion transmitting device according to claim 21, wherein all three said second, third and fourth circles intersect one another at the same two points.

23. A motion transmitting device including:
(a) eccentric means;
(b) meshing means in the form of a chain-loop of links, said links formed with two tooth-like profiles;
(c) pins hingedly interconnecting said links to one another;
(d) gear means formed with teeth complementary to said profiles;
(e) individual first movement-limiting means on said links;
(f) a series of individual second movement-limiting means on a datum member;

said first and second movement-limiting means separate from said profiles; said eccentric means being disposed to cause each of said profiles to become engaged with, and subsequently to become dissociated from said teeth whilst said profiles are individually guided by said first and second movement-limiting means within specific limits of movement relative to said datum member, such that always a plurality of adjacent ones of said profiles are simultaneously in engagement with, and stationary relative to, a corresponding number of said teeth, and that the total movement relative to said datum member of each of said teeth, whilst it is drivingly engaged with one of said teeth, follows an orbital locus.

* * * * *